United States Patent Office 3,351,002
Patented Nov. 7, 1967

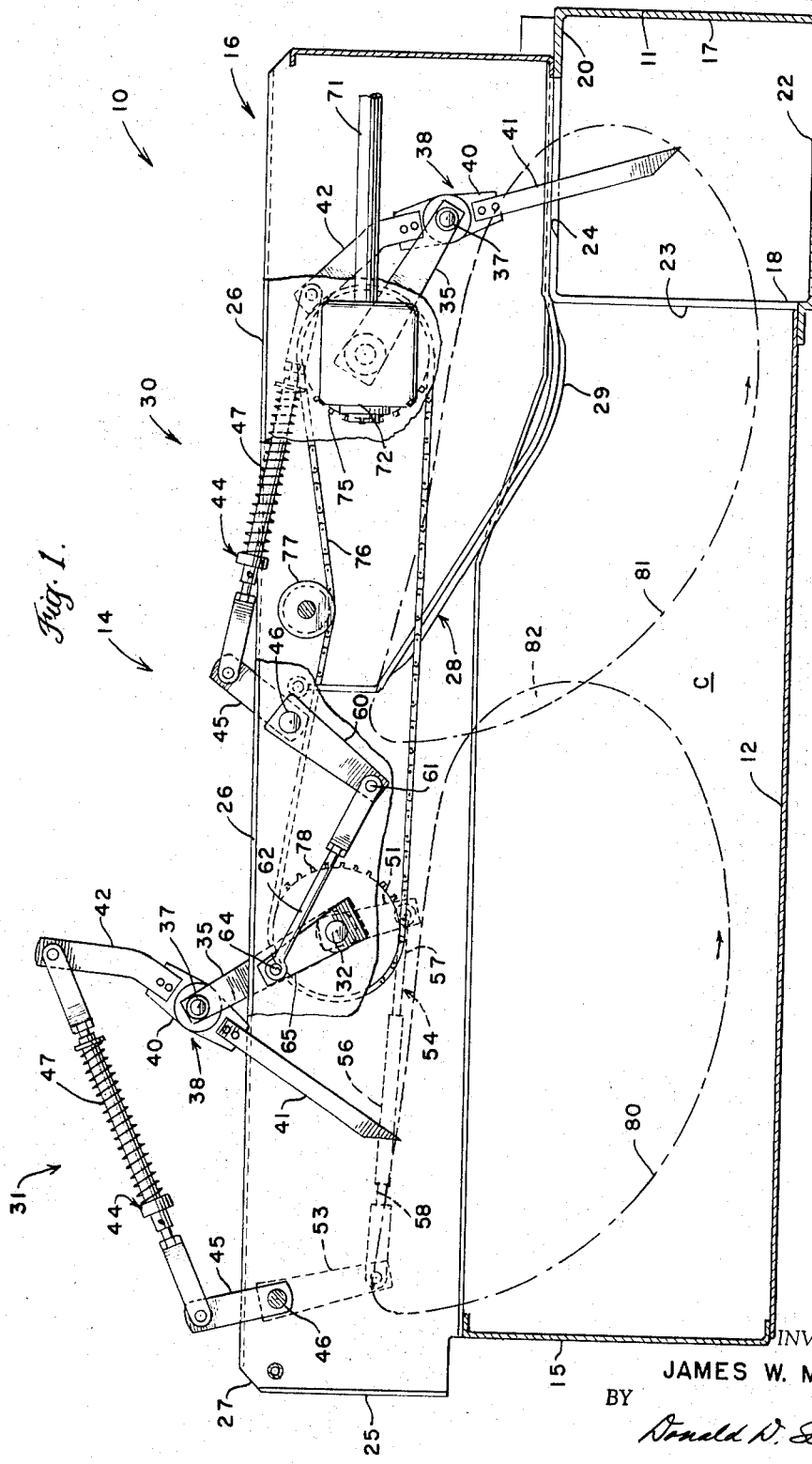

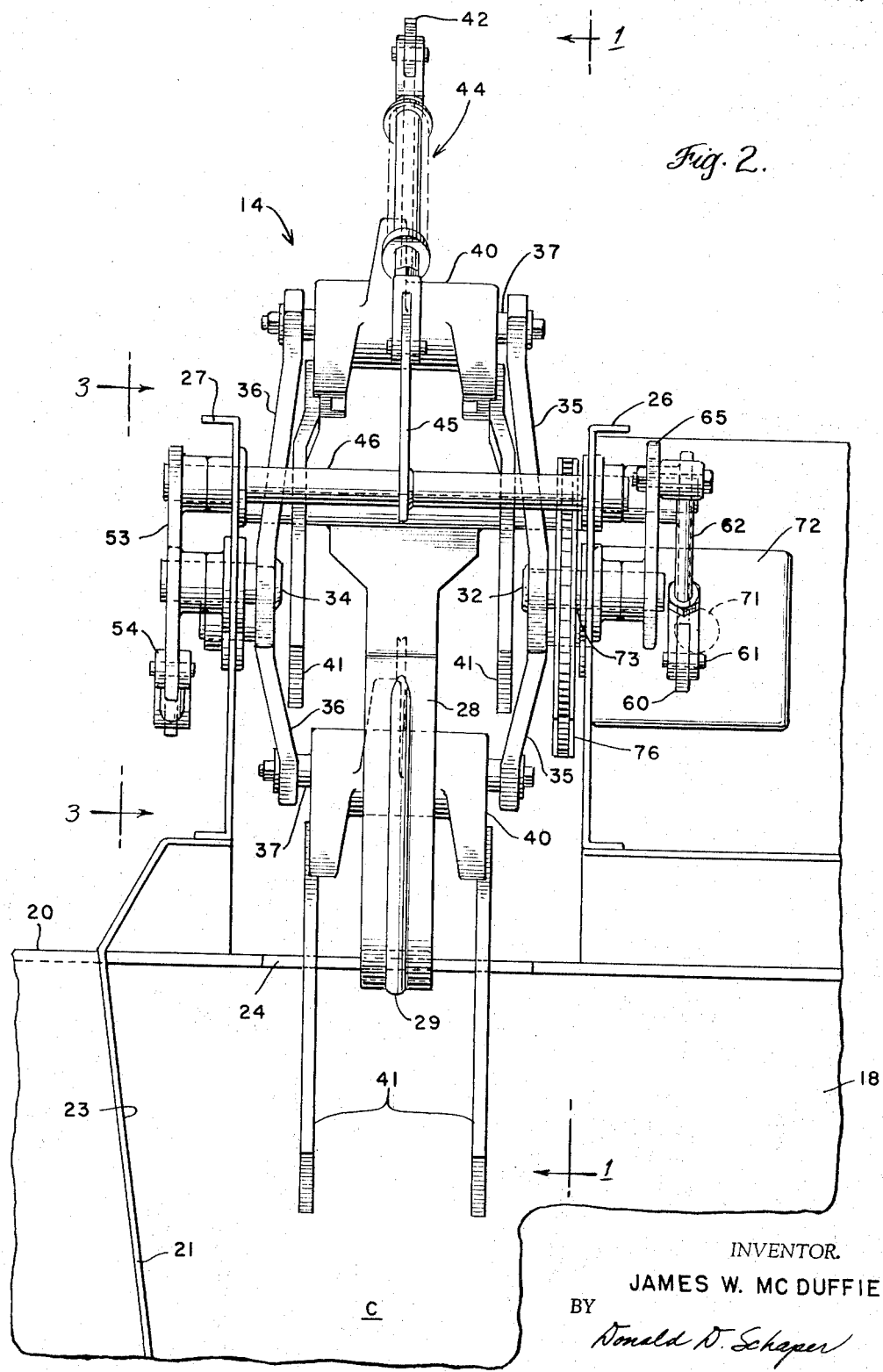

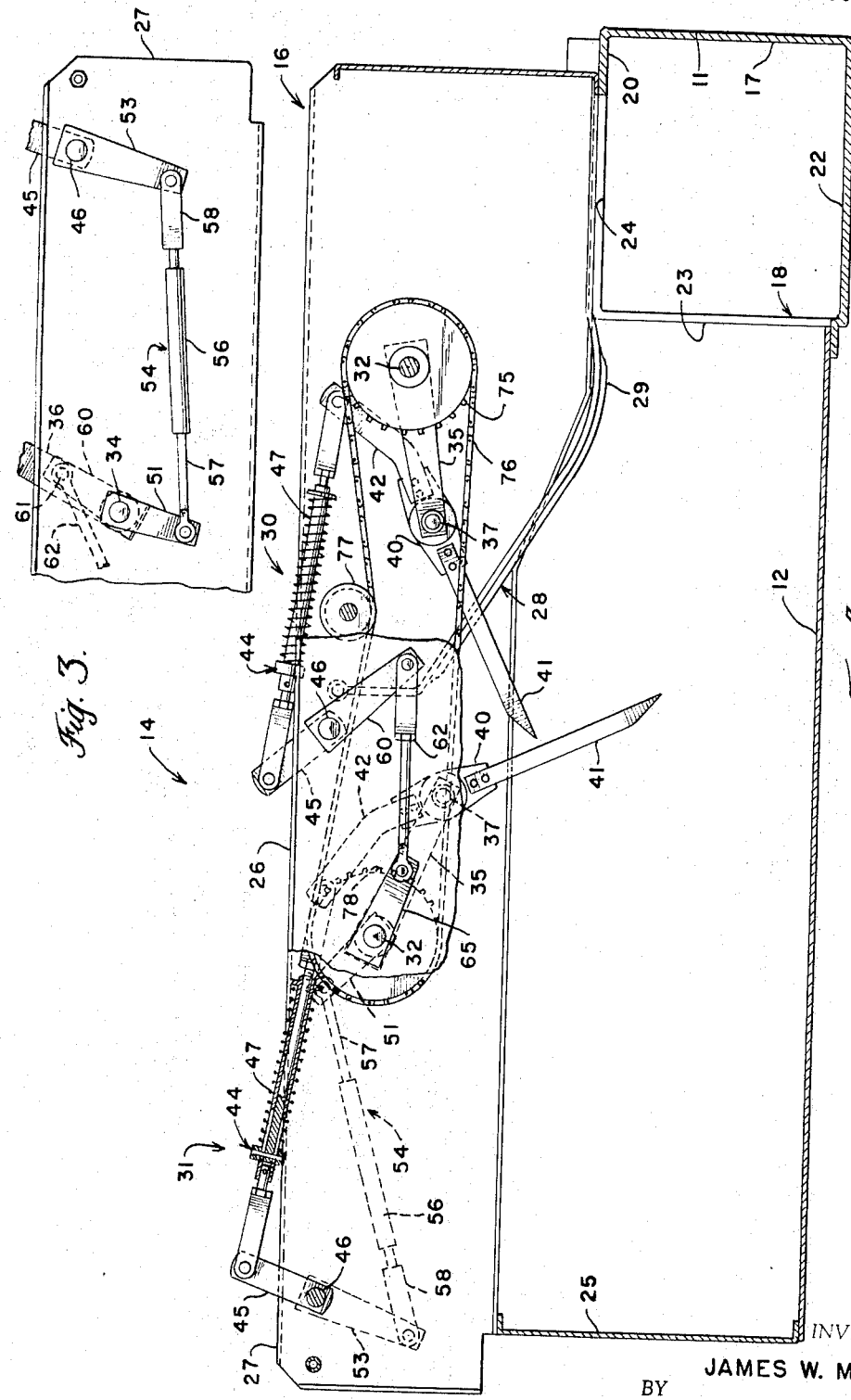

3,351,002
HAY BALER
James W. McDuffie, New Holland, Pa., assignor to Sperry Rand Corporation, New Holland, Pa., a corporation of Delaware
Filed Sept. 15, 1965, Ser. No. 487,382
11 Claims. (Cl. 100—189)

ABSTRACT OF THE DISCLOSURE

A feeder for a hay baler in which a pair of feed finger assemblies are operated in timed relation to each other with one assembly delivering crop material to the other assembly which conveys the material into the bale case. The attitude of the fingers in the feed finger assemblies is controlled by driven elements operatively connected to the fingers.

---

The present invention relates to automatic hay balers. More particularly, the invention relates to an improved mechanism for feeding hay into a bale chamber through an opening in the side wall of the chamber in time relation with a compressing plunger.

A conventional automatic hay baler comprises a pickup assembly which lifts hay or other crop material from the ground and deposits it rearwardly on a transverse receiving table or platform, a bale chamber extending fore-and-aft in the direction of travel of the baler, a reciprocating plunger within the bale chamber, and a feeder mechanism mounted over the platform which is adapted to convey the crop material along the platform and into the bale chamber through a feed opening therein. The crop material is compressed in the bale chamber by the plunger to form bales which are tied with twine or wire after they are completed.

It is known to provide a baler feeder mechanism with a pair of feed finger assemblies which sweep across the platform in timed relation to each other and to the plunger. Normally, a first feed finger assembly, or set of fingers, is employed to sweep the portion of the platform adjacent the bale case; a second feed finger assembly operates over the outboard or more remote portion of the platform and serves to feed crop material to the first feed assembly. The attitude of the feed fingers of each assembly relative to the platform is controlled, as they move through closed paths of travel, by an arm which extends from the upper portion of the feed finger assembly along the path of travel and is pivotally connected to a stationary shaft on the baler. The first feed finger assembly distributes the crop material across the bale chamber between each stroke of the plunger and the feed fingers thereon are extraced upwardly through a slot in the top wall of the bale chamber during a portion of each feed stroke.

In the feeder mechanism described, difficulties exist in maintaining the proper attitude of the feed fingers relative to the platform so that they efficiently sweep the entire platform area. More important, problems result in the attitudes of the fingers of the assemblies relative to each other. The feed assemblies operate out of phase, that is, when the first assembly is travelling on a feeding stroke the second assembly is returning and vice versa. Further, when the second assembly reaches a point adjacent the end of a feeding stroke, the fingers of the first assembly sweep downwardly and strip the delivered crop material from the fingers of the second assembly. However, in long, stemmy crop material there is a tendency for the material to become wedged between the fingers of respective assemblies if the fingers are improperly oriented relative to each other when they pass. There is also a tendency for crop material to become wedged between the fingers of the inboard feed finger assembly and the top wall of the bale case as the fingers start to move upward through the slot in the bale case top wall on their return stroke. Attempts, in prior-art feeders, to prevent wedging in the bale case by adjusting the fingers to assume a more vertical attitude as they leave the bale case have resulted in poorly shaped bales because the crop material is not sufficiently forced into the upper inner corner of the bale case. Often, as a result of the described wedging action, the shear bolt in the feeder drive breaks. Then the bolt must be replaced and the operator must clean out the wedged material before the baling operation can proceed.

One object of this invention is to provide a hay baler of the type described with an improved feeder mechanism.

Another object of this invention is to provide a baler feeder mechanism of the type described wherein first and second feed finger assemblies operate in unison, the second assembly delivering crop material to the first, and the first efficiently stripping delivered material from the second, the arrangement being such that there is no wedging of material between the assemblies.

A further object of this invention is to provide a baler feeder with an improved means to control the attitude of the feed fingers relative to the receiving platform and to each other as they move in their respective paths of travel.

Another object of this invention is to provide a hay baler of the type described with a feeder means which effectively sweeps crop material from the outboard portion of the receiving platform.

A still further object of this invention is to provide a baler feeder with adjustable means whereby the attitudes of the feed fingers may be varied to accommodate the feeder to different crop conditions.

Other objects of this invention will be apparent hereinafter from the specification and from the recital in the appended claims.

In the drawings:

FIG. 1 is a transverse vertical section taken approximately on the line 1—1 in FIG. 2 looking in the direction of the arrows and showing a feeder mechanism constructed according to this invention; portions of the forward housing wall of the feeder are shown in elevation to illustrate the drive means for the inboard or first finger feed assembly and the gearbox, both of which appear in front of the plane of the section; the first feed assembly is shown near the end of a feeding stroke and the second or outboard assembly is shown approaching the end of a return stroke;

FIG. 2 is an end view on an enlarged scale and looking toward the right in FIG. 1;

FIG. 3 is a fragmentary view taken as indicated on the line 3—3 in FIG. 2 looking in the direction of the arrows and showing a portion of the outboard assembly feeder control; and FIG. 4 is a view similar to FIG. 1, but with the feed finger assemblies in different positions and showing the assemblies just prior to the point where the fingers intermesh, with the first finger feed assembly sweeping downwardly to strip material from the second finger feed assembly.

Referring now to the drawings by numerals of reference, and particularly to FIG. 1, the infeed section 10 of a hay baler is shown which comprises a bale case 11, a hay receiving platform 12 on which crop material is deposited by a pickup (not shown), a feeder 14 for moving the crop material across the platform and into the bale case, and a feeder housing 16.

Bale case 11 is generally rectangular in cross-section and comprises vertical side walls 17 and 18, a top wall 20, and a bottom wall 22. A feed opening 23 is formed in side wall 18 for the passage of crop material, and a slot 24 is formed in top wall 20 in communication with the opening 23.

Feeder housing 16 comprises an outboard end wall 25, a front wall 26 and a rear wall 27. The walls 26 and 27 are vertically spaced from platform 12. The space between housing 16 and platform 12 and defined by side wall 15 and rear wall 21, forms an infeed chamber C adapted to receive crop material from a pickup, not shown. This general arrangement may be similar to that shown in U.S. Patent No. 2,950,670. The bottom of housing 16 extends generally parallel to platform 12 (FIG. 1) for a major portion of its length, and the housing is open. However, at a point adjacent bale case 11, a stripper bar 28 is provided which is inclined downwardly toward the bale case and has a portion 29 which projects below top wall 20 and the upper end of opening 23. This produces a pre-compression of crop material as it is conveyed into bale case 11.

Feeder 14 comprises an inboard feeder means or assembly 30 which operates over the section of platform 12 adjacent bale case 11 and in a path which travels through the bale case. It also comprises a second feeder means or assembly 31 which operates more remote from the bale case and over the remainder of platform 12. Each feeder assembly comprises a crankshaft 32 journalled in the wall 26 of housing 16 and a crank shaft 34 journalled in rear wall 27. The axes of these crankshafts are fore-and-aft. Cranks 35 and 36 are provided on the crankshafts and a crank pin 37 joins the outer radial ends of the cranks. A feed finger assembly 38 is rotatably mounted on each crank pin 37. Each feed finger assembly consists of a hub 40, feed fingers 41 and an upper arm 42.

Extending in the direction of feeder travel from each feed finger assembly 38 is means which controls the attitude of the fingers. It comprises a first link 44 and a second link 45 pivotally connected thereto. Link 45 is fixed to a control shaft 46 by welding or other means. Control link 44 is formed with telescoping sections and a spring 47 resists their separation to provide a cushioning means for feed fingers 41 in their paths of travel.

Drive means for oscillating control shafts 46 is provided and comprises a pair of drive mechanisms which are powered by the crankshafts 32 and 34 in the outboard feeder assembly 31. The drive mechanism for the outboard feeder comprises a radially extending element 51 fixed to crankshaft 34, a second element 53 fixed to the outboard control shaft 46 and a third element 54 which is pivotally connected to elements 51 and 53. These elements are located along rear wall 27 of housing 16 and they are related to each other as shown best in FIG. 3. A means of adjusting the length of element 54 is provided which comprises an internally threaded sleeve 56 and end portions 57, 58 threadably received therein.

For controlling the attitude of the inboard feeder assembly 30, an element 60 is affixed to the inboard control shaft 46. Element 60 is located forwardly of front wall 26 of housing 16. The element 60 is pivotally connected at 61 to an element 62 which is pivotally connected at 64 to an element 65 affixed to outboard crankshaft 32. Element 62 is adjustable as to length to vary the drive connection.

Thus, as crankshaft 34 of assembly 31 rotates, element 54 is reciprocated and element 53 is oscillated. This pivots outboard shaft 46 and operates through links 44 and the upper arm 42 of assembly 31 to control the attitude of the outboard feed fingers. At the same time, crankshaft 32 of assembly 31 rotates, and element 62 is reciprocated through element 65. This causes element 60 to be oscillated and inboard shaft 46 of assembly 30 is pivoted. This operates through the link 44 and the upper arm 42 of assembly 30 to control the attitude of the inboard feed fingers.

It is thus seen that the fingers on the feeder assemblies are pivoted and their attitudes controlled by power operated control shafts 46—46, the linkages being such that desired paths of finger travel are obtained and assembly 30 is properly operated in relation to assembly 31.

Power means for the feeder 14 comprises an input drive shaft 71 (FIG. 1) in a gearbox 72, and an output drive shaft 73 (FIG. 2). Output shaft 73 is connected to sprocket 75 on crankshaft 32 in the inboard feeder 30. An endless transverse chain 76 operative in a vertical plane extends around sprocket 75, past idler 77, and around a sprocket 78 connected to the crankshafts of outboard feeder 31.

In operation, power is supplied through shaft 71, gearbox 72 and shaft 73, to the drive sprockets 75 and 78. Sprockets 75, 78 serve to rotate the inboard and outboard pairs of crankshafts 32, 34 and the cranks thereon to orbit the feed assemblies 38 about the crankshaft axes. Elements 51 and 65 on the outboard crankshafts 34 and 32, respectively, oscillate the control shafts 46—46 through connecting elements 54 and 62. As the control shafts 46 are oscillated, the feed finger assemblies are caused to pivot on their crank pins 37 and the attitude of each of the sets of feed fingers with respect to platform 12 is thereby controlled at each point in its path of travel.

The inboard feeder means 30 and outboard feeder means 31 are driven at the same speed and travel in timed relation to each other through substantially identical paths of travel 80 and 81 (see FIG. 1). These paths overlap as indicated at 82 in FIG. 1. Feeder means 31 sweeps the crop material from the outboard end of the platform 12 and toward bale case 11 to a location where it is picked up by inboard feeder means 30. Inboard feeder means 30 then moves the crop material past portion 29 of the stripper bar 28 and into bale case 11. As the feed fingers 41 move from the positions shown in FIG. 4, they intermesh. The fingers of feeder 30 sweep downwardly relative to the upwardly travelling fingers of feeder 31. Thus the feeder 30 strips material from the fingers of the outboard feeder means. The top wall 20 of bale case 11 provides a stripping and cleaning action on fingers 41 of the inboard feeder means 30 as the fingers are retracted upwardly through the slot 24.

As shown in FIG. 4 the fingers of feeder assembly 30 are almost perpendicular to the fingers of assembly 31 when the paths of the respective fingers approach a location where they cross. This attitude is made possible by the drive mechanism to the respective assemblies as regulated by control shafts 46—46. The relationship of the fingers to each other provides efficient stripping, and material will not be wedged between the respective sets of fingers. Plugging of the feeder is prevented and a smooth infeed of hay to the bale chamber results.

Further, the fingers 41 of assembly 30 are properly disposed relative to bale case 11 as they pass through it. The incline of the fingers toward side wall 17 as they sweep through the bale case cause the crop material to be directed toward the upper outer corner formed by wall 17 and top wall 20. This occurs without wedging, as would be the case if the fingers were inclined too sharply. If the fingers were too erect, improper bale shape would result. With the structure of this invention, an optimum finger-bale case relationship is achieved.

While this invention has been described in connection with a particular embodiment thereof, it will be understood that it is capable of modification, and this application is intended to cover any variations, uses, or adaptations following in general, the principles of the invention and including such departures from the present disclosure as come within known or customary practice in the art to which the invention pertains, and as fall within the scope of the invention or the limits of the appended claims.

Having thus described my invention, what I claim is:

1. An automatic hay baler comprising a fore-and-aft extending bale chamber having a feed opening in a vertical side wall thereof and a slot in a top wall, a generally horizontal hay receiving platform extending laterally from adjacent the lower end of said opening, a feeder operable over said platform for conveying crop material through said opening and into said bale chamber, a feeder housing projecting vertically upwardly from said platform, said platform having an inboard end adjacent said opening, and an outboard end remote from said opening, said housing comprising an outboard end wall adjacent said platform outboard end, a rear wall above one portion of said platform and a forward wall adjacent another portion of the platform, a first pair of crankshafts mounted in line with each other in a fore-and-aft direction in said rear and forward walls respectively, first crank means on said first pair of crankshafts, a second pair of crankshafts mounted in line with each other in a fore-and-aft direction in said rear and forward walls respectively and spaced laterally away from said first pair of crankshafts and said bale case, second crank means on said second pair of crankshafts, said feeder comprising a first feed finger assembly pivotally mounted on said first crank means and a second feed finger assembly pivotally mounted on said second crank means, each of said feed finger assemblies comprising a pivotally mounted hub on said crank means, at least one feed finger having a crop engaging tip extending from said hub in one direction, an arm extending from said hub in a direction generally opposite from said one direction, a first control shaft journalled in said rear and forward walls of said housing and outboard of said first feed finger assembly, a second control shaft journalled in said rear and forward walls of said housing and outboard of said second feed finger assembly, a first pair of control links connecting said first feed finger assembly to said first control shaft, a second pair of control links connecting said second feed finger assembly to said second control shaft, and drive means for oscillating said control shafts to control the angular position of said feed fingers relative to said platform and to each other, said drive means comprising first and second drive mechanisms, and each of said drive mechanisms having link elements connecting said second pair of crankshafts to said control shafts for oscillating said control shafts as said crankshafts are rotated.

2. An automatic hay baler, as recited in claim 1, wherein a gearbox is located adjacent said first feed finger assembly, a first drive sprocket is mounted on one of said first pair of crankshafts and operatively connected to said gearbox, a second drive sprocket is mounted on one of said second pair of crankshafts, and an endless chain extends around each of said drive sprockets.

3. An automatic hay baler comprising a fore-and-aft extending bale chamber having a top wall and a vertical side wall with a feed opening therein, a generally horizontal hay receiving platform extending laterally from adjacent the lower end of said opening, a feeder operable over said platform for conveying crop material through said opening and into said bale chamber, a feeder housing projecting vertically upward from said platform, said feeder comprising a pair of feed finger assemblies, one of said finger assemblies being mounted to travel in a path over a first portion of said platform adjacent said bale chamber, the other of said finger assemblies being mounted to travel in a path over a second portion of said platform remote from said bale chamber, control means extending between the feeder housing and each of said finger assemblies to regulate the position of said finger assemblies relative to said platform and to each other, said control means comprising at least one control shaft journalled in said housing, drive means for operating said control means, said drive means comprising a first element which rotates about a horizontal axis extending in the direction of said bale case, a second element affixed to said control shaft, and a third element having one end connected to said first element for orbital movement about said axis as said first element is rotated and an opposite end connected to said second element for oscillating the second element and the control shaft connected thereto when said first element is rotated.

4. An automatic hay baler comprising a fore-and-aft extending bale chamber having a feed opening in a vertical side wall thereof, a generally horizontal hay receiving platform extending laterally from adjacent the lower end of said opening, a feeder operable over said platform for conveying crop material through said opening and into said bale chamber, a feeder housing projecting vertically upward from said platform, a pair of crankshafts journalled in said housing, a pair of cranks on said crankshafts, a feed finger assembly pivotally mounted intermediate its end on each of said cranks, a first control link extending generally in the direction of travel of said crop material from each feed finger assembly, a second control link connected to each of said first control links, a pair of control shafts journalled in said housing, said second links each having one end fixed to an associated one of said control shafts, and drive means for turning said control shafts through arcs to control the attitude of each feed finger assembly with relation to said platform and to the other feed finger assembly.

5. An automatic hay baler, as recited in claim 4, wherein power is transmitted through said crankshafts to rotate said cranks and propel said drive means.

6. An automatic hay baler, as recited in claim 5, wherein each feed finger assembly comprises at least one feed finger having a crop material engaging tip which moves in a closed path of travel to sweep crop material into the bale chamber, and said drive means comprises adjusting means to vary said path of travel.

7. An automatic hay baler, as recited in claim 6, wherein said drive means comprises a first element which rotates about said crankshaft axis, a second element fixed to said control shaft and a third element having one end connected to said second element for oscillation therewith and an opposite end which is connected to said first element and orbits about said crankshaft axis.

8. An automatic hay baler, as recited in claim 6, wherein the paths of travel of said feed finger assemblies overlap and said assemblies intermesh whereby the fingers of one assembly are stripped free of any crop material by the other assembly.

9. An automatic hay baler comprising a fore-and-aft extending bale chamber having a feed opening in a vertical side wall thereof, a generally horizontal hay receiving platform extending laterally from adjacent a lower end of said opening, a feeder operable over said platform for conveying crop material through said opening and into said bale chamber, a feeder housing projecting vertically upward from said platform, said feeder comprising at least one elongated feed finger assembly having a lower end extending into the direction of said platform and an upper end spaced therefrom, means pivotally supporting said assembly intermediate its ends, said supporting means being independently revoluble about an axis extending generally in the direction of said bale chamber to move the assembly in a closed path over at least a portion of said platform, control means for regulating the attitude of said assembly and the path of travel of said assembly lower end, said control means comprising a first link extending generally in the direction of travel of said crop material and connected to said upper end of the finger assembly, a second link connected to said first link at a point remote from said connection to the feed finger assembly, a control shaft journalled adjacent said second link and connected thereto, and drive means for turning said control shaft through a predetermined arc of less than 360° to control the attitude of said feed finger assembly.

10. An automatic hay baler, as recited in claim 9, wherein said one feed finger assembly is mounted to travel over a first portion of said platform adjacent said bale chamber, and a second feed finger assembly is mounted to travel in a closed path over a second portion of said platform remote from said bale chamber, a second control means is connected to said second feed finger assembly, and a second drive means is operatively connected to said second control means.

11. An automatic hay baler, as recited in claim 9, wherein said drive means comprises a first element which rotates about a horizontal axis extending in the direction of said bale case, a second element is fixed to said control shaft, and a third element has one end connected to said first element for orbital movement about said horizontal axis as said first element is rotated and an opposite end connected to said second element for oscillating the second element and the control shaft connected thereto when said first element is rotated.

References Cited

UNITED STATES PATENTS

| | | | |
|---|---|---|---|
| 2,765,902 | 10/1956 | Myers | 198—223 |
| 2,862,347 | 12/1958 | Nelson | 100—142 X |
| 3,044,243 | 7/1962 | Wenzel | 100—189 X |

FOREIGN PATENTS

| | | |
|---|---|---|
| 238,730 | 5/1962 | Australia. |
| 622,262 | 6/1961 | Canada. |
| 617,955 | 2/1961 | Italy. |

LOUIS O. MAASSEL, *Primary Examiner.*